(12) United States Patent
Brazier

(10) Patent No.: US 7,784,571 B2
(45) Date of Patent: Aug. 31, 2010

(54) MOTORIZED SNOWBOARD

(76) Inventor: Glen Brazier, P.O. Box 214, Karlstad, MN (US) 56732-0214

( * ) Notice: Subject to any disclaimer, the term of this patent is extended or adjusted under 35 U.S.C. 154(b) by 292 days.

(21) Appl. No.: 11/652,455

(22) Filed: Jan. 11, 2007

(65) Prior Publication Data
US 2008/0169146 A1    Jul. 17, 2008

(51) Int. Cl.
B62D 11/00 (2006.01)
(52) U.S. Cl. ....................... 180/9.44; 305/44
(58) Field of Classification Search ............... 180/9.44; 305/44
See application file for complete search history.

(56) References Cited

U.S. PATENT DOCUMENTS

| 3,548,962 | A | * | 12/1970 | Best ........................ 180/9.44 |
| 3,794,131 | A | | 2/1974 | Freedman |
| 3,934,664 | A | * | 1/1976 | Pohjola ..................... 180/9.44 |
| 4,119,356 | A | * | 10/1978 | Pohjola ..................... 305/158 |
| 4,129,990 | A | * | 12/1978 | Valantin .................... 405/299 |
| 4,143,728 | A | | 3/1979 | Shiber |
| 4,188,076 | A | * | 2/1980 | Pohjola ..................... 305/165 |
| 4,232,911 | A | * | 11/1980 | Valantin .................... 305/120 |
| 4,307,788 | A | | 12/1981 | Shelton |
| 4,534,437 | A | | 8/1985 | Howerton |
| 4,714,125 | A | * | 12/1987 | Stacy, Jr. ................... 180/182 |
| 4,828,339 | A | * | 5/1989 | Thomas et al. ............. 305/202 |
| 4,984,648 | A | | 1/1991 | Strzok |
| 5,127,488 | A | | 7/1992 | Shanahan |
| 5,305,846 | A | | 4/1994 | Martin |
| 5,662,186 | A | | 9/1997 | Welch |
| 6,193,003 | B1 | | 2/2001 | Dempster |
| 6,435,290 | B1 | | 8/2002 | Justus |
| 6,698,540 | B1 | | 3/2004 | Decker |

* cited by examiner

Primary Examiner—Kevin Hurley
(74) Attorney, Agent, or Firm—DL Tschida

(57) ABSTRACT

A gasoline engine powered snowboard having an endless track trained about a support frame containing driven and idler wheels. A molded chassis having a contoured track support pan cooperates with a fringed track and forward and rear foot supports to enable steering with foot and body movements. Engine operation is directed from operator directed servos coupled to the engine. The support pan exhibits a beveled contour and includes a recessed center region. The track is divided into center and right and left fringe portions defined by seriatim, lateral slits. Alternating rows of transverse, laterally offset drive lugs and ground contact lugs project from internal and external surfaces of the track. The drive lugs rotate within a contoured recess provided in the support pan. The ground contacting lugs exhibit contoured thickness profiles and provide transverse horizontal and obtuse extending portions that exhibit elongated, inverted V-shapes. Steering movements can also be effected with rollers or pads mounted to engage the ground contacting filamentary members of the track.

33 Claims, 12 Drawing Sheets

MOTORIZED SNOWBOARD

BACKGROUND OF THE INVENTION

The present invention relates to a powered snowboard assembly and, in particular, to a gas engine powered snowboard having an endless, laterally slotted track supported to rotate about a frame assembly in contact with a chassis support pan having a recess, rails and beveled surfaces that directionally promote track flexion and steering in response to weight adjustments placed on foot control surfaces.

A wide variety of engine powered, personal vehicles have been developed for recreational travel over land, water and snow. Some dry land skateboard type vehicles that accommodate a standing operator are shown at U.S. Pat. Nos. 6,435,290; 5,127,488; and 4,143,728. Some snow based vehicles that accommodate seated operators are shown at U.S. Pat. Nos. 4,534,437 and 3,794,131. Several track supported snow vehicles that accommodate standing operators are shown at U.S. Pat. Nos. 6,698,540; 6,193,003; 5,662,186; 5,305,846; 4,984,648; and 4,307,788.

Different types of downhill snowboards and related improvements have also been developed to satisfy the ever changing human desire for challenging recreational devices. The U.S. Pat. No. 5,662,186 is directed to a powered snowboard having a multi-section operator and engine platforms that align at different inclinations. The latter vehicle is not particularly adapted to mimic the operating experience of a conventional un-powered snowboard.

The present invention was developed to provide a motorized snowboard. The device supports a standing operator and, except for engine operation, is controlled and steered with foot movements that mimic the experience of riding a conventional snowboard. The present snowboard, however, can be used over all types of surfaces from steep to moderate hills and undulating or flat terrains. The snowboard particularly extends the experience of riding a snowboard to flat and moderate hilly recreational areas that normally might only accommodate snowmobiles.

SUMMARY OF THE INVENTION

It is a primary object of the invention to provide an engine powered vehicle that can be steered with foot and/or body movements.

It is further object of the invention to provide a snowboard type vehicle supported over an operator steered endless track.

It is further object of the invention to provide a snowboard type vehicle that is steered by a standing operator.

It is an object of the invention to provide a track support frame having a drive sprocket and a plurality of idler wheels that cooperate with an engine mounted to a surrounding chassis.

It is further object of the invention to provide an operator directed cable-type or electromechanical engine control linkage.

It is further object of the invention to provide a track having a plurality of slits that laterally extend from a central track portion and define flexible fringe pieces.

It is further object of the invention to provide a track having fringe pieces that support flexible ground contacting lugs.

It is further object of the invention to provide a track having rows of transversely extending ground contact steering lugs that depend from a central track portion and adjoining lateral fringe pieces that are laterally staggered at adjacent rows.

It is further object of the invention to provide ground contact steering lugs at the fringe pieces that exhibit raised isosceles triangular-shaped surfaces and that transversely extend at obtuse angles from interconnected lugs depending from the center portion of the track.

It is further object of the invention to provide a contoured track support pan at the bottom of the chassis that cooperates with the drive and steering lugs to steer the vehicle with operator foot and body movements.

It is further object of the invention to provide a beveled chassis bottom having a drive lug receiving recess, rail(s) and/or other mechanisms to prevent track dislodgement.

The foregoing objects, advantages and distinctions of the invention are obtained in alternative track frame assemblies. In one construction, the snowboard comprises an endless track trained about a track support frame containing driven and idler or "bogie" wheels. The track support frame is mounted to a molded chassis having forward and rear foot supports. A gasoline engine mounts to upper surfaces of the chassis and a drive linkage couples the engine to the track support frame and depending track. Engine drive power is transferred via a clutch and interconnected chain/belt drive linkages to a drive shaft that supports a track drive sprocket and idler shafts that support drive wheels that engage an interior surface of the track.

Engine operation is directed from cabling and/or electromechanical servos coupled to the engine. The bottom surface of the chassis (i.e. chassis support pan) includes a longitudinal recess formed adjacent contoured edge surfaces that engage interior track surfaces to directionally promote track movements that steer the vehicle in response to operator movements and weight shifting at the foot control surfaces. Drive lugs that engage the drive sprocket project from the interior track surface. The edges of the track follow the contours of the chassis support pan. The pan can exhibit bevels and/or valleys, recesses, cutouts and/or other surface shapes that directionally promote track movement in cooperative response to operator or other induced movements that flex the track.

The track is divided into a center portion containing upright interior drive lugs and right and left fringe portions. The center portion exhibits a relatively narrow width (e.g. less than one-third the overall track width) and from which the drive lugs project in rows and pass along a longitudinal recess having arcuate (e.g. ovular) sidewalls. Adjoining surfaces of the fringe portions ride over beveled edge surfaces of the support pan. Lateral movement of the track is restrained as the drive lugs cooperate with the side walls of an ovular recess in the support pan.

External surfaces of the right and left fringe portions contain rows of laterally depending ground contact or steering lugs. The fringe portions each comprise a number of filamentary members defined by seriatim, slots or gaps. The fringe pieces support rows of ground engaging lugs that are transversely offset from centered steering lugs. The region of ground contact of the steering lugs of each fringe piece transversely overlaps the span of the steering lugs of the adjoining fringe pieces.

The ground engaging lugs exhibit contoured thickness profiles. Depending forward and trailing surfaces taper to a ridged apex. The lateral extension of the forward and trailing lug surfaces define a straight central portion and end portions that obtusely radiate relative to the central portion. Collectively, the lugs direct forward track movement as rows of depending ground contacting lugs at the filamentary members flex with operator movements as the filamentary members follow the contoured support pan to directionally promote steering movements.

Still other objects, advantages, distinctions, constructions and combinations of individual features of the invention will become more apparent from the following description with respect to the appended drawings. Similar components and assemblies are referred to in the various drawings with similar alphanumeric reference characters. The description to each combination should therefore not be literally construed in limitation of the invention. Rather, the invention should be interpreted within the broad scope of the further appended claims.

DESCRIPTION OF THE PREFERRED EMBODIMENTS

Figure 1:
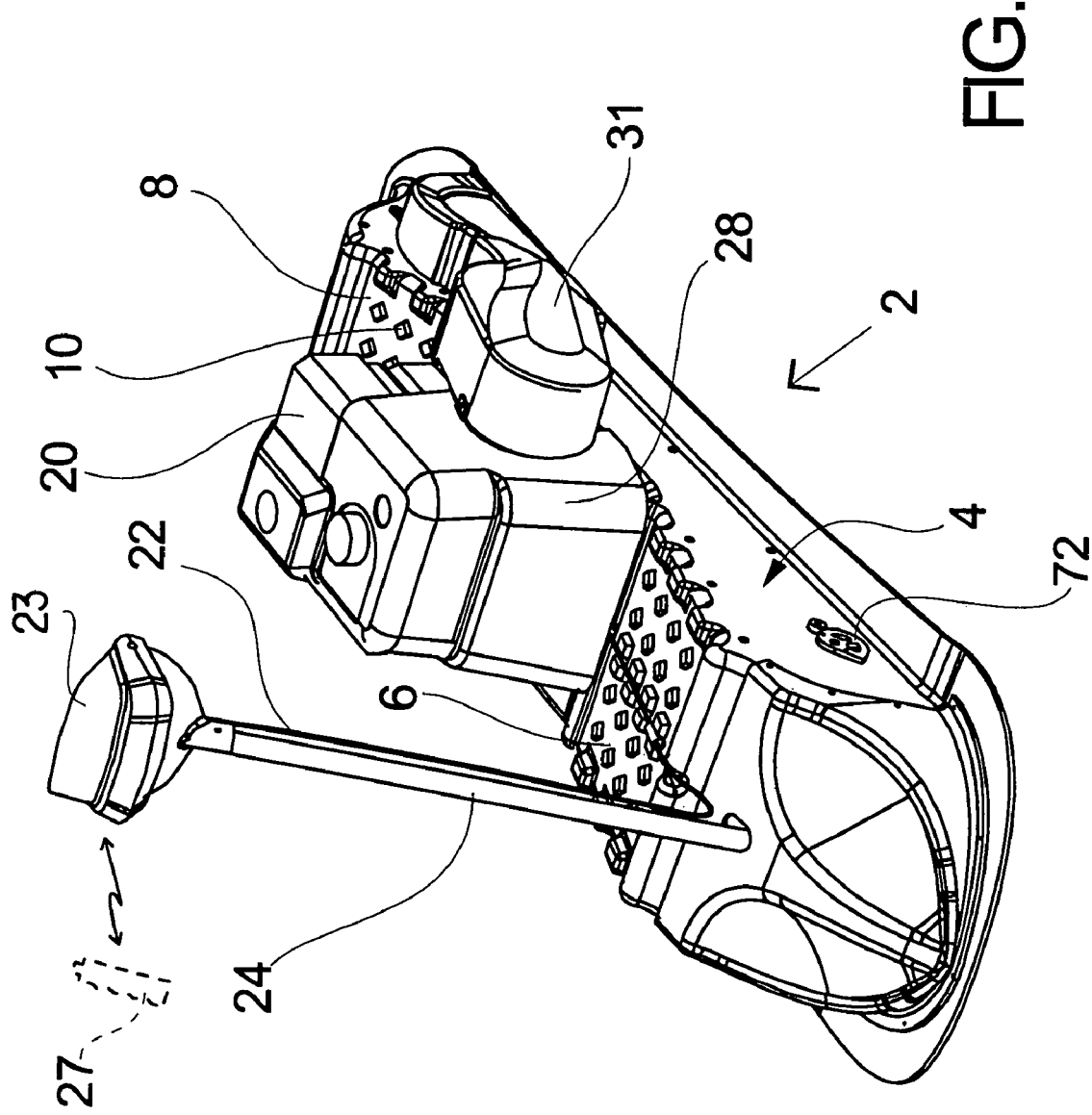
FIG. 1 shows a perspective view to a personal, engine powered snowboard assembly.
Figure 2:
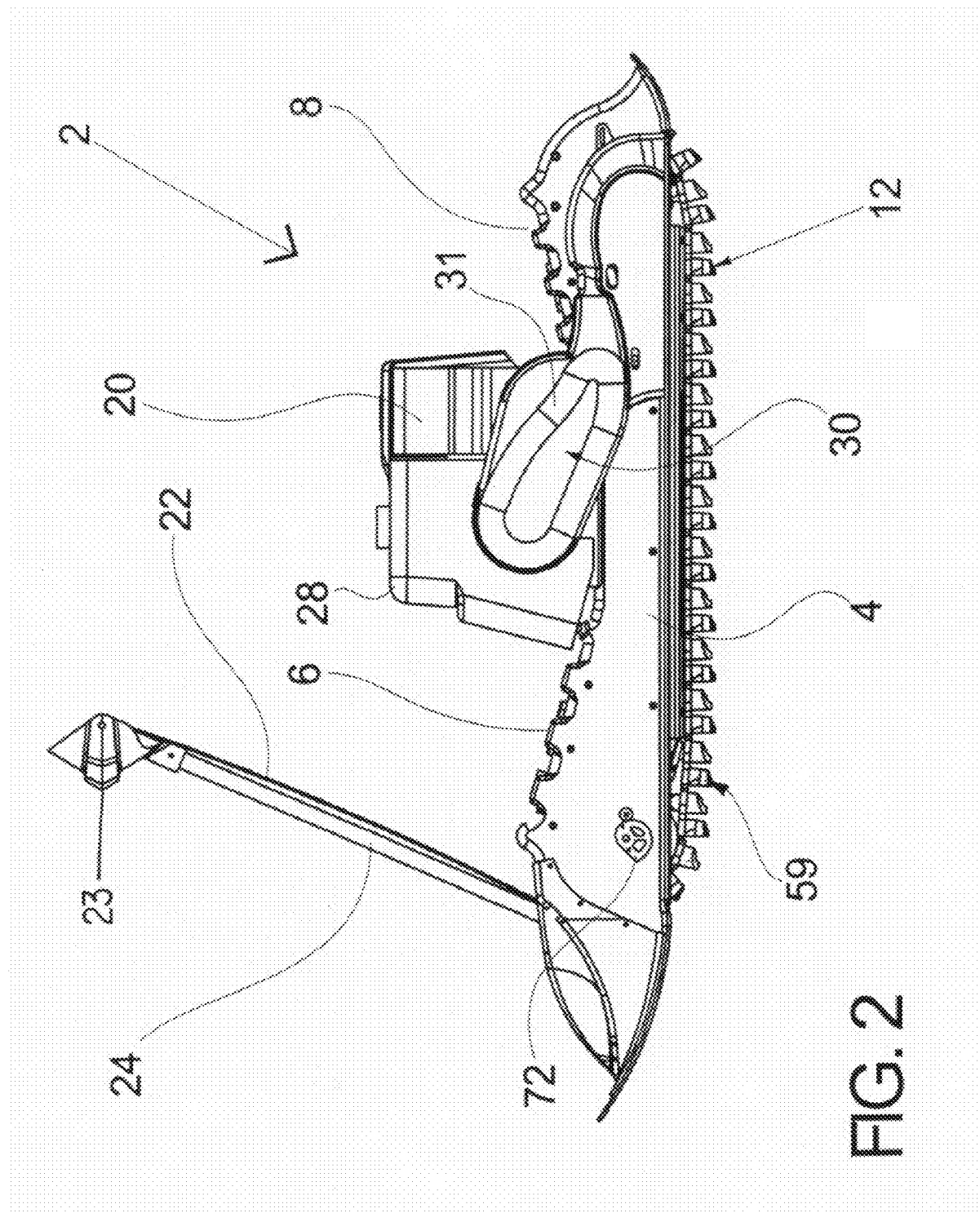
FIG. 2 shows a right side view of the assembly and wherein the mounting relationship of the engine, clutch, and chain and belt track drive linkages are more apparent.

With attention to the perspective view of FIG. 1, an improved snowboard assembly 2 of the invention is shown. The assembly 2 provides a framework or chassis 4 that is formed to support an upright operator. Fore and aft operator or steering platforms 6 and 8 are shaped and oriented to comfortably support an operator's booted feet. The exposed surface of each of the two platforms 6 and 8 is constructed to provide traction to facilitate operator steering movements. The platforms 6 and 8 can include surface knurling, granular coatings, fastened matting or other traction enhancing materials 10 that assure non-slippery contact with the platform surfaces during normal use. Straps, bindings or surfaces shaped to mate with an operator's foot ware (not shown) can also be provided at the platforms 6 and 8.

Each platform 6 and 8 is shaped and sized to accommodate independent movement of the operator's feet within the space and/or shifting of the operator's weight laterally and/or fore and aft. The shifting of the operator's weight particularly induces a supported drive track 12 shown at FIGS. 2-4 and 6-12 to flex and dynamically vary the contact of the track 12 with a bottom surface of a support pan 14 of the chassis 4 and ground engaging lugs at the track 12 with the snow. The support pan 14 is mounted between longitudinal flanges 63 and 65 of the chassis 4. Steering is thus obtained with the dynamic changes in track contact with the supporting snow or ice.

Steering control is particularly obtained by constructing the support pan 14 to include elongated contoured edge surfaces 66 and 68 (e.g. beveled) that bound a longitudinal recess 18. The recess 18 can for example exhibit ellipsoid, ovular or other longitudinal arcuate-shaped sidewalls 19. The surfaces 66 and 67 and recess 18 are aligned to cooperate with interior surfaces of the track 12 to direct track flexion and retain the track to the chassis 4 over a range of steering motions. Simultaneous variations in vehicle speed can be applied to modulate steering motions. Particular details to the construction of the contoured edge surfaces 66 and 67 and recess 18 and responsive flexion of the track 12 are discussed below with respect to FIGS. 7 through 10. One or more rails might also be provided alone or in combination with the recess 18 to limit lateral track movement and facilitate track retention.

A gasoline engine 20 (e.g. 5-10 hp) is mounted between the foot platforms 6 and 8. The engine 20 is located relative to the platforms 6 and 8 to slightly overweight the vehicle's aft end to maintain an upward trim angle at the fore end. The risks of possible operator discharge from the vehicle 2 due to porpoising or nose-diving with a downward trim angle are thereby alleviated. A DC motor with a storage battery and appropriate controls might alternatively be incorporated into the vehicle 2.

A mechanical (e.g. cable) or electro-mechanical control linkage 22 extends from the engine 20 and is manipulated by the operator. The linkage 22 is routed along an upright support column 24 or can be held in an operator's hands. A cowling 23 covers hand controls 26 coupled to a cable 22 and fitted to the support column 24 are presently preferred. The column 24 also provides a degree of stabilization to the operator during steering motions. The shape of the column 24 (e.g. tilt angle, bends, supports etc.) and coupling to the chassis 4 can be adjusted as desired to accommodate operator ergonomics and stabilize the operator.

Although a cable 22 is presently used, a wireless, radio frequency (RF) electro-mechanical drive might also be adapted to the engine 20. In such a circumstance, an operator handheld controller 27 (shown in dashed line) might transmit RF signals via provided actuators (e.g. button, slide or joy stick) and a transceiver to one or more electromechanical servos coupled to the vehicle 2 (e.g. engine throttle). Engine operation and other operating mechanisms and parameters might thereby be controlled. Other servos might be mounted to the chassis 4, for example, to vary the shape of the support pan 14, change the ground contact surface of the chassis 4 or direct track flexion.

In the latter regard, one or more flexing members, slide pads or roller(s) 29' (shown in dashed line at FIGS. 3 and 10) can be mounted to bear on an appropriate interior surface(s) of the track 12 to flex the track 12 and induce a desired steering. The rollers 29' can exhibit different shapes (e.g. circular, elliptical) or be mounted for eccentric rotation from a supporting assembly. The rollers 29' might also be mounted to a support frame that actively or passively moves relative to the support pan 14 to appropriately flex filamentary members at the track 12. Control of the rollers 29' might be actively directed with linkages that direct the rollers 29' to contact the track with varying force at preferred locations (e.g. bounded or unbounded filamentary pieces) as appropriate. Details to the construction of the track 12 and cooperation with the chassis 4 to effect steering are provided below.

The engine 20 is encased beneath a cover or safety shroud 28 to prevent operator contact with any moving parts or the exhaust system. The engine 20 is mounted to direct exhaust gases away from the operator. A hinged shroud 31 is mounted to the side of the shroud 28 and covers a clutch and drive linkage assembly 30 coupled to the track 12. The chassis 4 can include other safety features and can be formed to exhibit any desired aerodynamic and/or aesthetic shape. The chassis 4 might also be constructed to accommodate multiple operators, passengers or permit towing of sleds or accessory appliances.

With attention to FIGS. 2 through 5, views are shown to the drive linkage 30. The linkage 30 includes a centrifugal clutch 32 that is mounted to an output shaft 33 of the engine 20. A drive belt 34 extends from the clutch 32 and is trained around another centrifugal clutch 36 supported to a transfer shaft 38. A belt 40 is trained from another sprocket (not shown) mounted beneath the clutch 36 to a sprocket 44 fitted to an idler shaft 46. Yet another belt 48 extends to a track drive shaft 50 and sprocket 52 mounted to the shaft 50.

A track drive sprocket 54 is centered on the shaft 50 and provides several lateral extending teeth 56 that engage upright drive lugs 58 that project from an interior surface of the track 12. Multiple drive sprockets 54 can also be fitted to the chassis 4. Exposed ground lugs 59 depend from the exterior surface of the track 12 and engage the snow. The ground lugs 59 are constructed and positioned to direct forward motion and facilitate steering.

Figure 3:
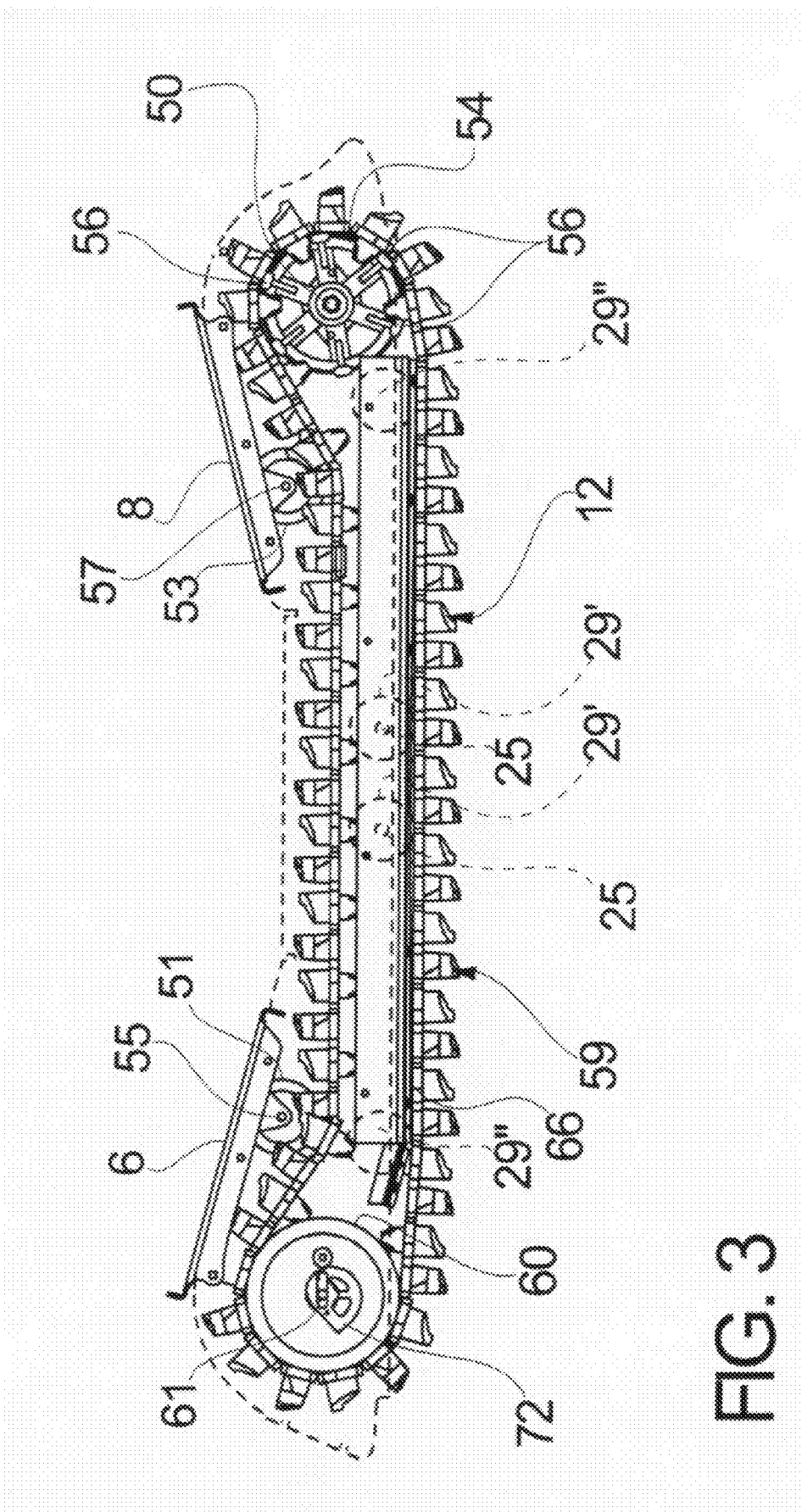
FIG. 3 shows a longitudinal cross section view to the track support frame and drive sprocket.
Figure 4:
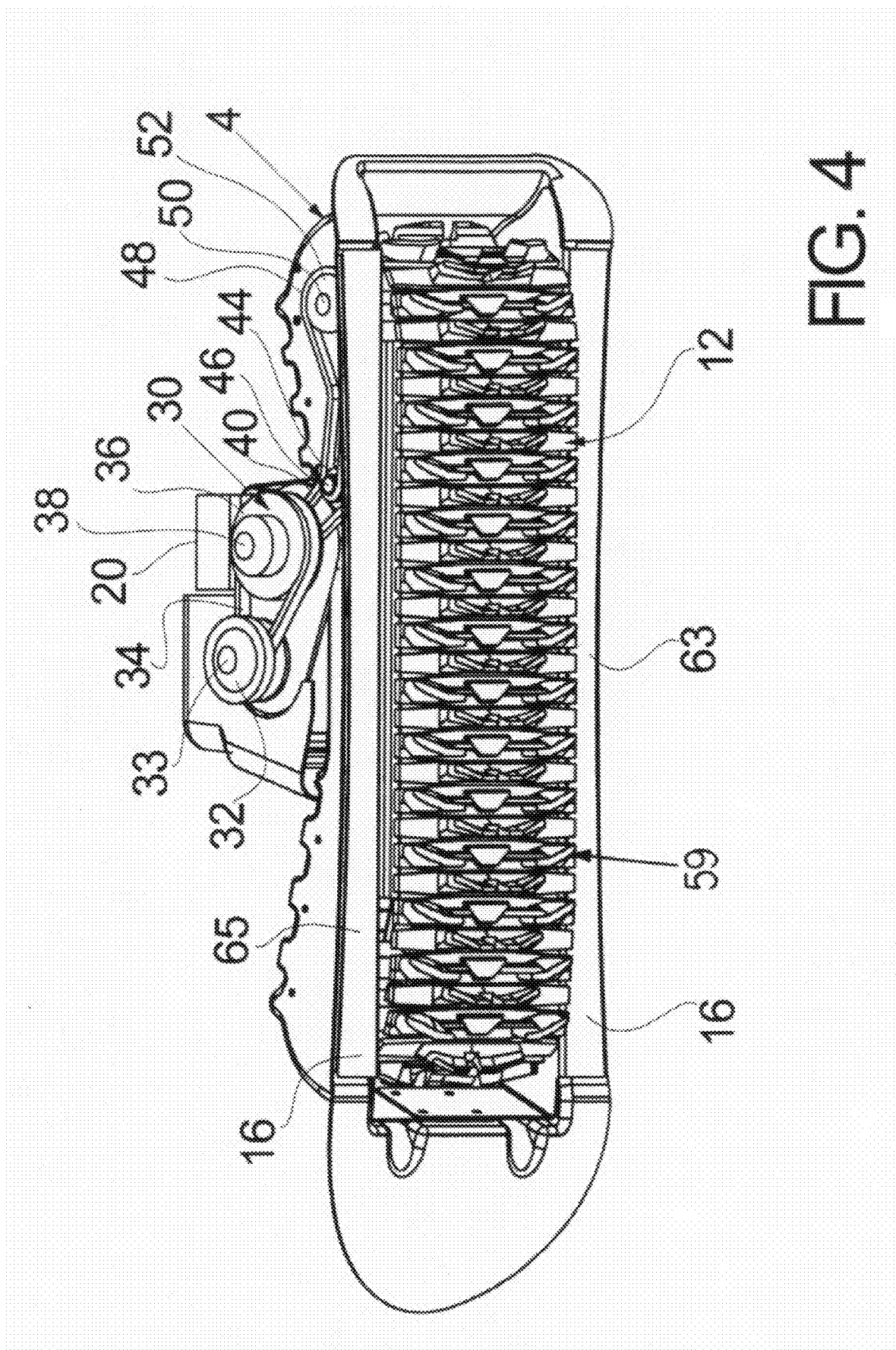
FIG. 4 shows a perspective view to the mounting relation of the track to the bottom track support pan and ground engaging surfaces of the snowboard assembly.

Separately depicted at FIG. 3 is a diagrammatic view to the routing of the track 12. The interior surface of the track 12 is trained around the aft drive sprocket 54 and a pair of forward idler wheels 60 mounted to an idler shaft 61. The chassis support pan 14 supports the track 12 intermediate the aft sprocket 54 and front wheel(s) 60. Several rubber coated idler wheels 51 and 53 ride on the upper surface of the track 12. The idler wheels 51 and 53 are mounted to intermediate idler shafts 55 and 57 fitted to the chassis 4. The idler wheels 51 and 53 support the track 12 to direct the track in non-contacting relation beneath the foot support platforms 6 and 8 and engine 20. The idler wheels 51 and 53 are mounted to be adjustable and/or resiliently biased to maintain a relatively constant track tension on the track 12.

Figure 5:
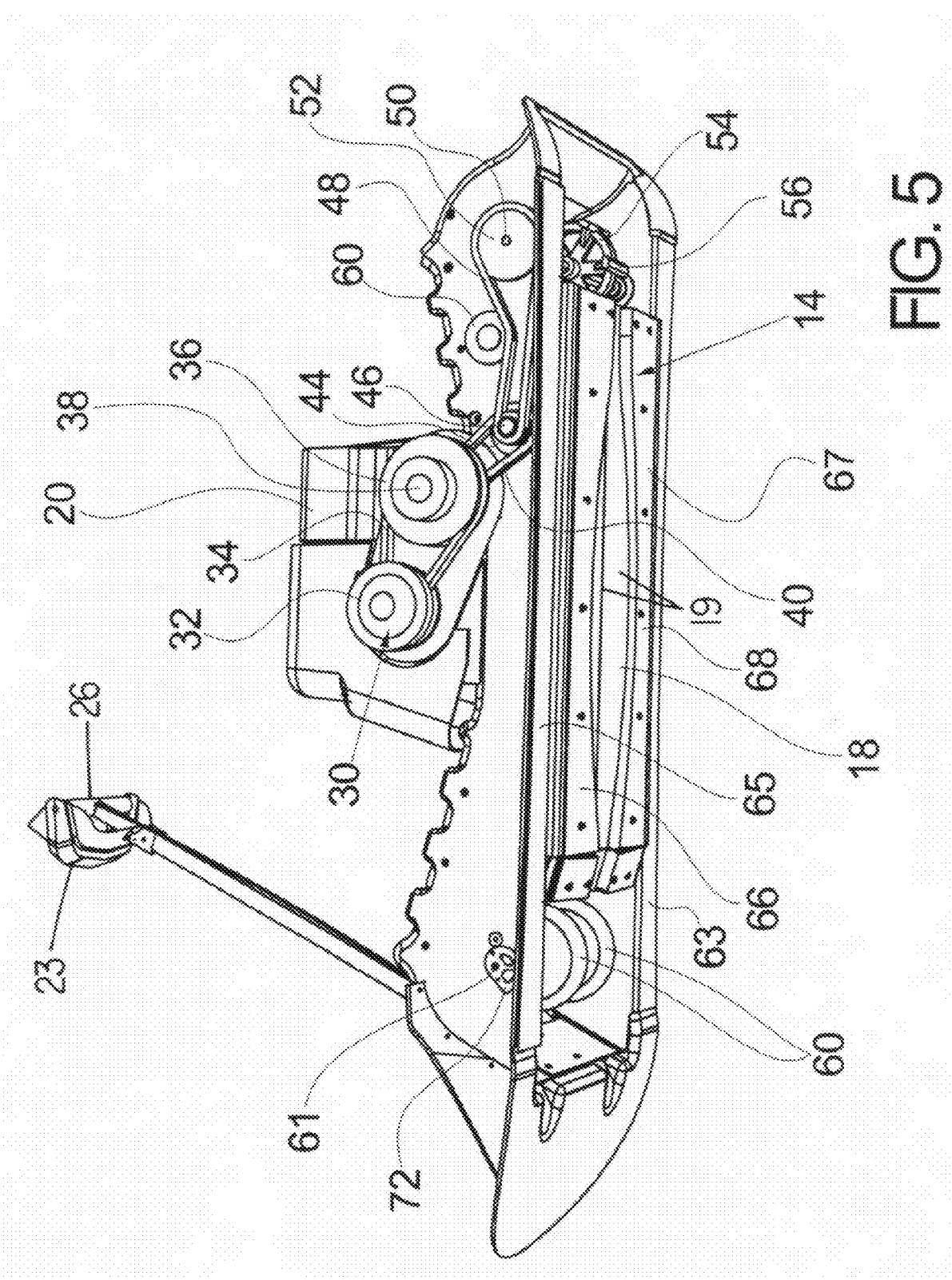
FIG. 5 shows a perspective view to the right side and bottom control surface of the snowboard assembly with the drive linkage cowling and track removed.

With additional attention to FIG. 5, the track 12 otherwise contacts and rotates over the contoured, longitudinal slide surface of the support pan 14. Exposed longitudinal flanges 63 and 65 of the chassis 4 extend along the sides of the support pan 14 and glide over the snow. Adjacent the flanges 63 and 65 are contoured surfaces 66 and 68 of the support pan 14 that exhibit a slight V-shaped bevel when viewed end-on, reference FIGS. 10 and 12. The drive lug recess 18 extends the length of the support pan 14 and is centered between the track contact surfaces 66 and 67. The drive lugs 58 rotate in the recess 18. More details to the cooperation of the track 12 with the beveled surfaces 66 and 68 to achieve steering are discussed below with respect to FIGS. 9 through 12.

Mounted to the chassis 4 to engage opposite ends of the forward idler axle 61 are adjustable tensioners 72. The tensioners 72 are supported to rotate the shaft 61 in an eccentric fashion. Upon rotating the tensioners 72 and shaft 61, the idler wheels 60 vary the tension of the track 12. The tension is normally set to center the rotation of the track 12 relative to the idler wheels 60 and support pan 14.

Figure 6:
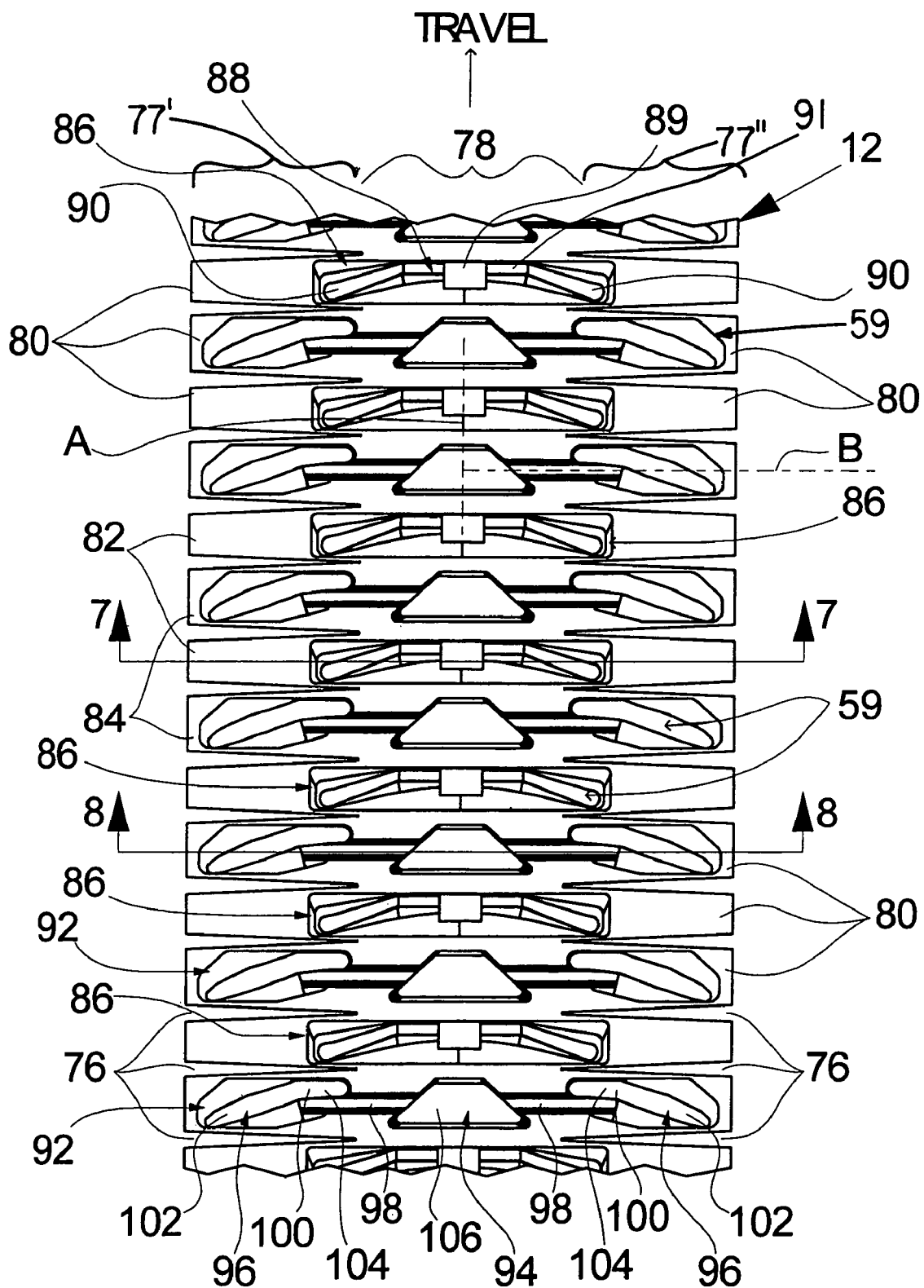
FIG. 6 shows a plan view of the ground engaging, exterior surface of the track depicting the arrangement of the displaced, transverse, laterally extending steering lugs.
Figure 7:
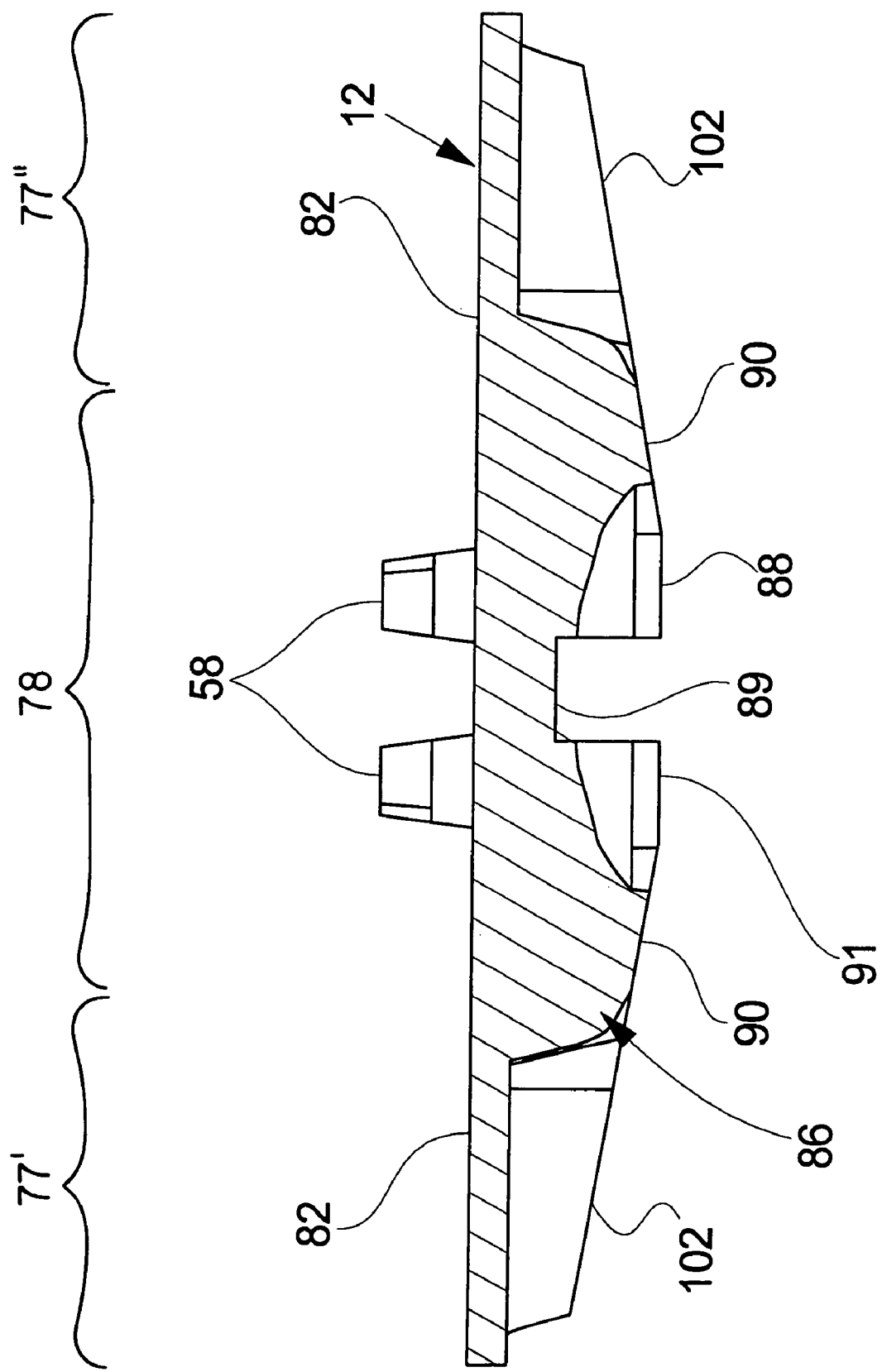
FIG. 7 shows a transverse cross section view through the track taken along reference lines 7-7 of FIG. 6.
Figure 8:
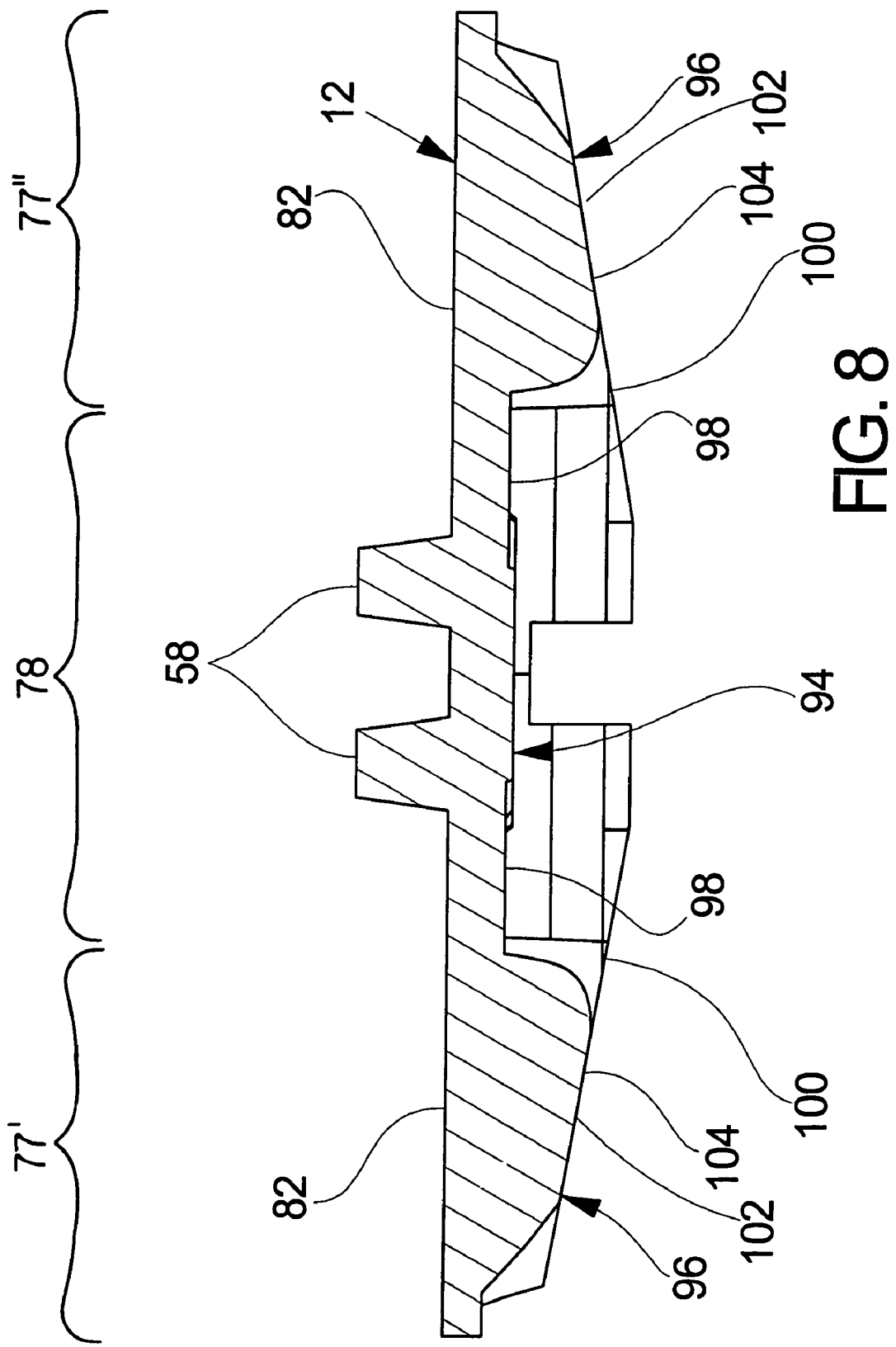
FIG. 8 shows a transverse cross section view through the track taken along reference lines 8-8 of FIG. 6.

The novel construction of the track 12 is particularly depicted at the partial plan and cross section views of FIGS. 6-8. The cooperation of the track surfaces with the support pan 14 to provide steering control and maneuverability over the snowboard 2 is shown and discussed with respect to FIGS. 9-12. Returning attention to FIG. 6 however and in distinction to a continuous, constant width belt, the belting of the track 12 is constructed with a number of lateral notches, gaps or slots 76 that are formed into left and right fringe portions 77' and 77" of the track 12. The slots 76 extend from a center drive portion or drive band 78 to left and right peripheral edges of the track 4. The slots 76 define flexible track pieces or filamentary fringe pieces 80 at the fringe portions 77' and 77" that radiate from the central drive band 78 relative to a longitudinal center axis "A" along transverse axes "B". Smooth interior surfaces 82 of the fringe pieces 80 engage the beveled edge surfaces 66 and 68 of the support pan 14. Although the slots 76 are shown open ended, the slots 76 may be closed ended. That is, the filamentary members 80 may be bounded by portions of the track 12.

A series of laterally displaced drive lugs 58 project from the interior surface of the drive band 78 and engage the sprocket teeth 56 and pass along the central portion of the pan 14 at the recess 18, reference FIGS. 7 and 8. Rows of the ground engaging ground lugs 59 depend from the opposite, exterior side of the drive band 78 and the fringe pieces 80. The ground lugs 59 are shaped and arranged to optimize forward travel.

The ground lugs 59 are organized into alternating rows 82 and 84 of lugs 86 and 92 that exhibit shapes designed to optimize vehicle performance over snow. The rows 82 each provide a single lug 86 that approximately spans the width of the central band 78. The lugs 86 depend from the track 12 between the overlying drive lugs 58. Each lug 86 provides an upright center piece 88 having a center recess 89. End pieces 90 extend at obtuse angles from opposite ends of the center piece 88. Leading and lagging surfaces (relative to the track travel direction) of the lug pieces 88 project from a relatively wide base at the track surface to a narrow elevated apex 91. The lugs 86 thereby exhibit an elongated, inverted V-shape relative to the rotational travel direction of the track 12.

The alternating rows 84 separately provide lugs 92 that span both the center drive band 78 and the fringe pieces 80. The rows 84 extend beneath the drive lugs 58. Each lug 92 is constructed of a trapezoid or pyramidal-shaped center piece 94 and laterally displaced end pieces 96. The center and end pieces 94 and 96 are coupled together with straight, upright web pieces 98.

The end pieces 96 extend the width of the fringe pieces 80 at the rows 84. The end pieces 96 include short horizontal sections 100 and longer end sections 102 that extend at obtuse angles from the horizontal sections 100. The lug and web pieces 96 and 98 project from a relatively wide base at the track surface to a narrow apex 104. The center piece 94 rises to an apex 106 approximately twice the width of the apex 104.

The lugs 92 also exhibit an elongated, inverted V-shape relative to the rotational travel direction of the track 12. Rotation of the center pieces 94 overlaps the regions of ground contact of the lugs 86 and movement of the fringe pieces 80 and particularly the end sections 102 provides steering control.

Figure 9:
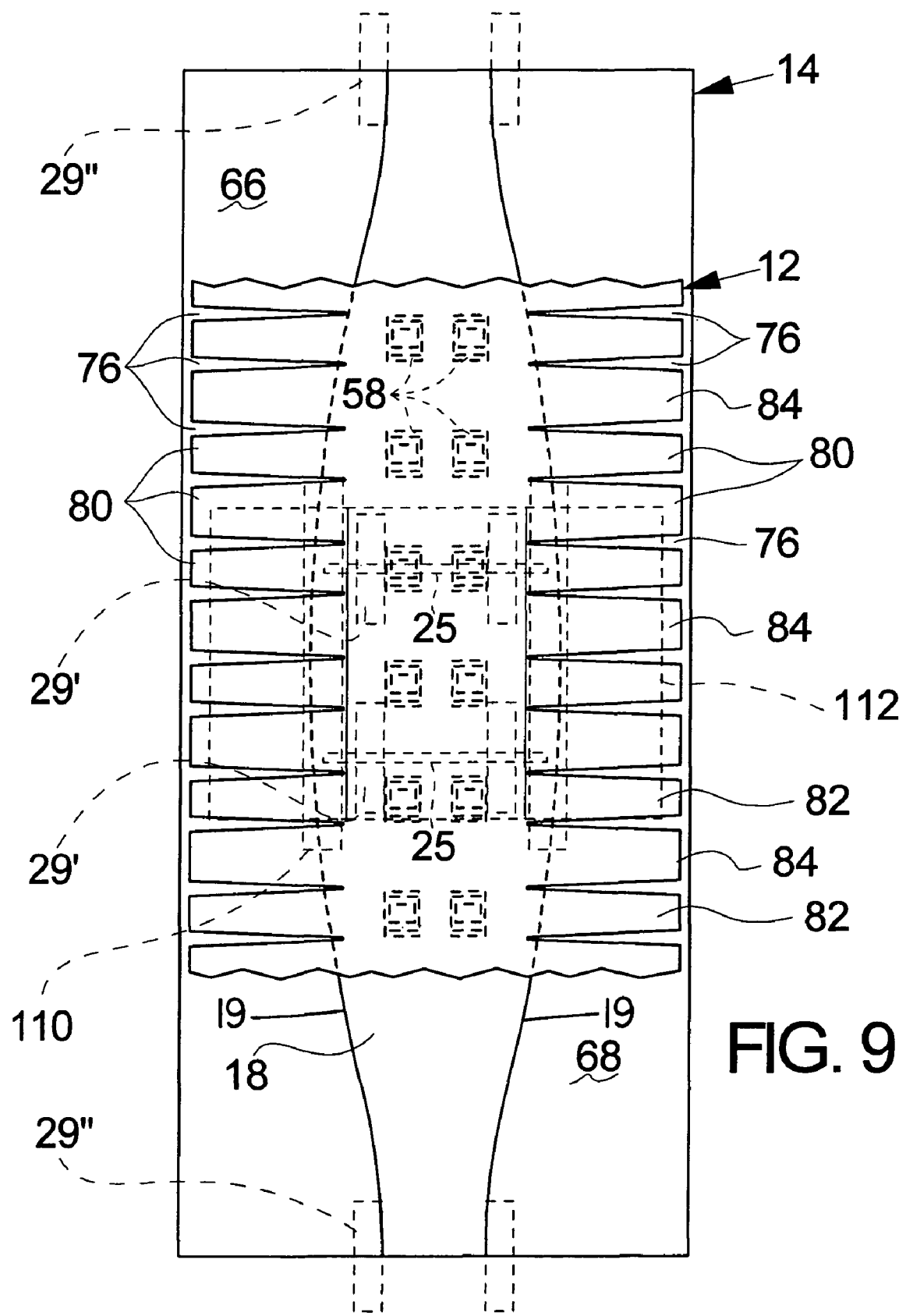
FIG. 9 shows a diagrammatic plan view of a portion of the track in an un-flexed, straight line condition and wherein alternative operator directed, wheeled steering assemblies (shown in dashed line) are mounted to mechanically flex the track.
Figure 10:
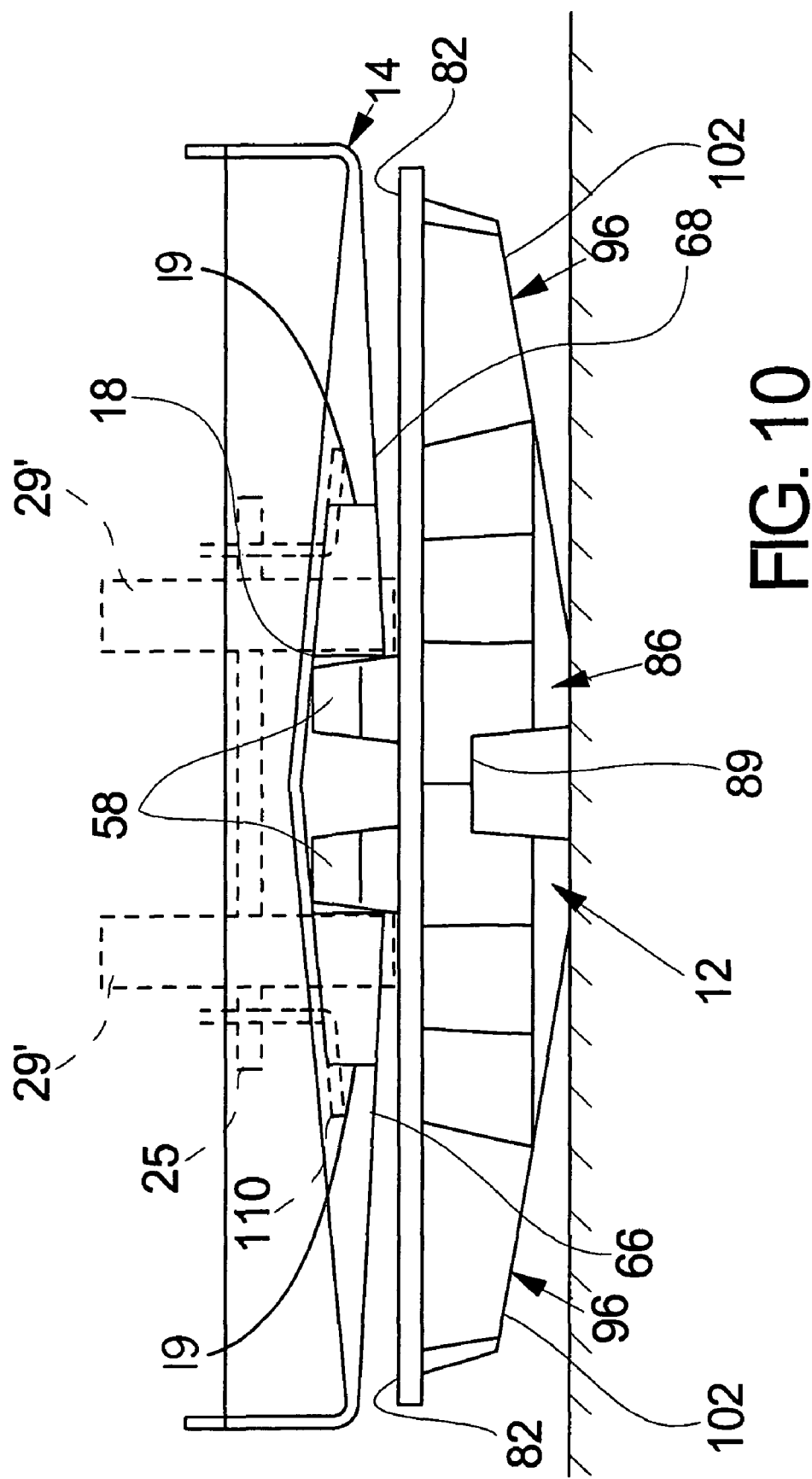
FIG. 10 shows an end view of the track centered along the chassis support pan in an un-flexed, straight line condition.
Figure 11:
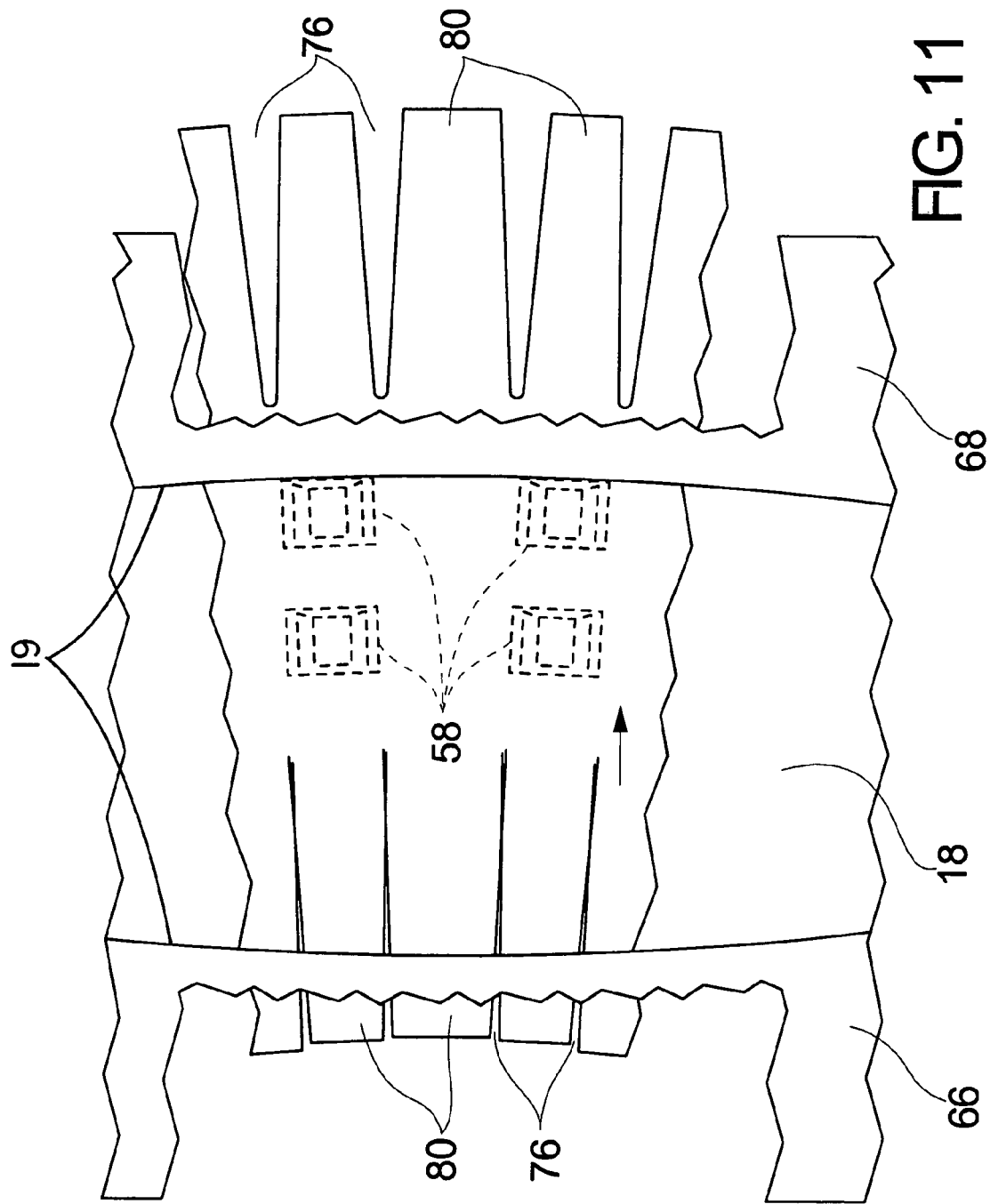
FIG. 11 shows a diagrammatic view of the interior surface of the track in a flexed, turning condition.

In the latter regard and with attention to FIGS. 9 through 12, vehicle steering is achieved by dynamically varying the contact of the smooth interior surfaces 82 of the fringe pieces 80 and tops of the drive lugs 58 with the beveled support pan surfaces 66 and 68 and the top wall of the recess 18. FIGS. 9 and 10 depict a straight line condition wherein the operator's weight is centered on the chassis 4 with the support pan 14 generally riding horizontal to the ground. The fringe pieces 80 are correspondingly centered over the support pan 14.

Steering is achieved by varying the operator's position and/or weight on the operator platforms 6 and 8 to change the contact dynamics of the track 12 with the support pan 14. For example, as the operator applies weight to the left side of the chassis 4 and with attention to FIGS. 11 and 12, the support pan 14 tilts. The left side of the track 12 engages the snow, the fringe pieces 80 at the left fringe portion 77' collapse or compress inward against themselves as they contact the beveled edge surface 66 of the pan 14. The compression of the left side of the track 12 causes the left side to cup which action exaggerates the gripping action of the left side lug end sections 102 with the snow. The drive lugs 58 correspondingly move to the right in the recess 18 and contact the sidewalls of the recess 18.

The respective slots 76 and fringe pieces 80 at the right fringe portion 77" independently diverge and the interior surface 82 at the right side of the track 4 rotates with limited contact with the beveled surface 68. The vehicle 2 responds to the opposing compression and expansion of the fringe pieces 80 at the slots 76 to turn left or right. The simultaneous gripping of the snow by the end pieces 96 of the drive lugs 58 enhances the responsiveness of the vehicle 2 to turn.

Figure 12:
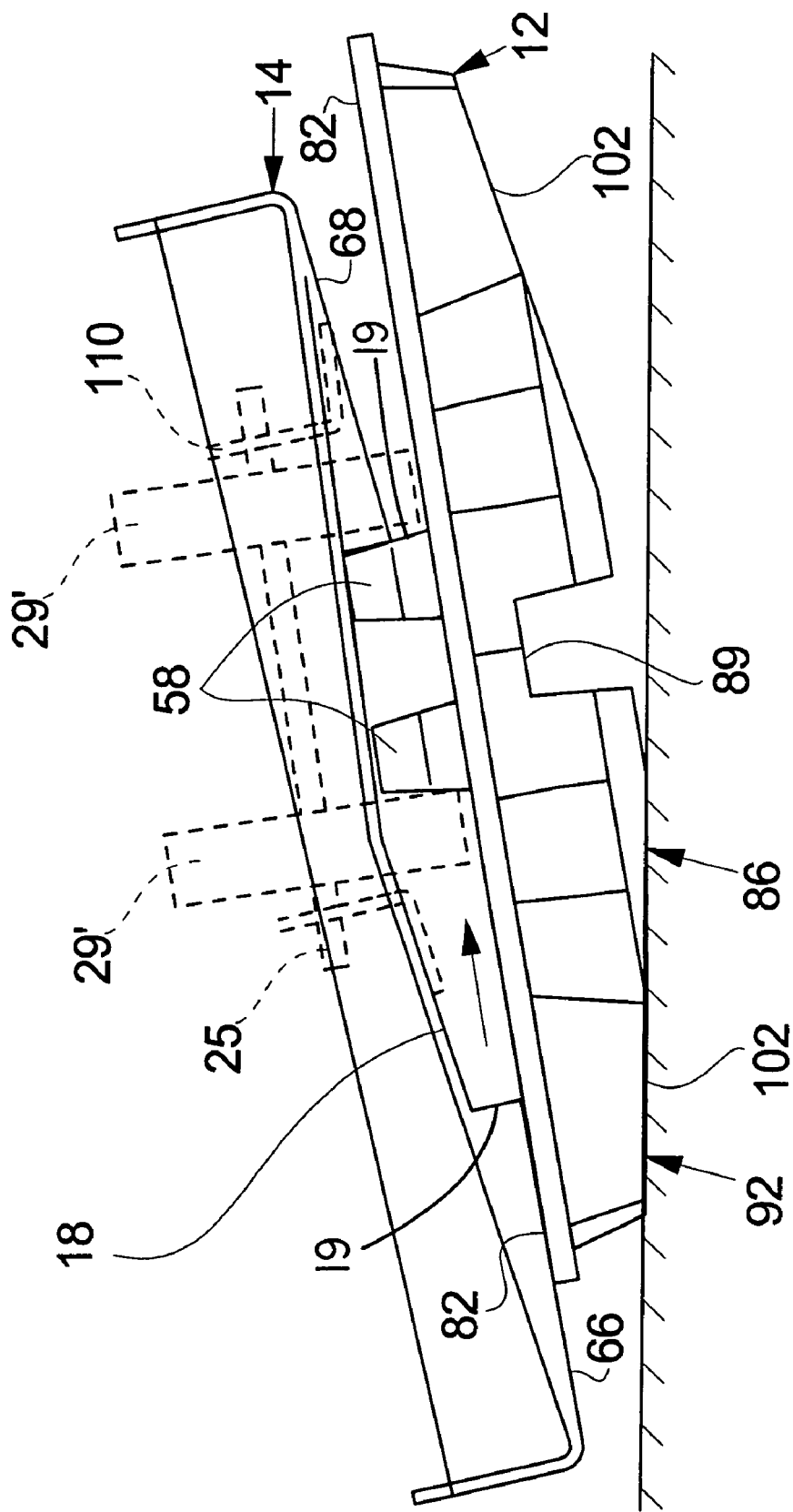
FIG. 12 shows an end view of the track laterally shifted relative to the chassis support pan corresponding to the flexed, turning condition of FIG. 11 and wherein operator directed steering members of the alternative assemblies of FIG. 9 are shown in dashed line.

In a similar fashion, the controlled application of force on the fringe pieces 80 via the steering rollers 29' shown in dashed line at FIGS. 9 and 12 can produce directional steering flexion. The flexion can be derived by depressing one side of the rollers 29' and/or elevating the other side relative to the fringe members 80. The axles 25 can be manipulated in different fashions similar to shifting an operator's weight to derive appropriate track contact. Additional steering rollers 29" shown in dashed line at FIG. 3 can also be mounted at the ends of the recess 18 to re-center the track 12 relative to the drive sprocket 54 and/or idler rollers 60.

Also shown at FIG. 9 in dashed line is a sliding assembly wherein steering rollers 29' and axles 25 are mounted to "L" brackets 110 that span a cutout region 112 in the pan 14. The brackets 110 permit the rollers 29' to laterally slide to and fro to engage the fringe members 80. Contact of the drive lugs 58 with the side walls 19 of the recess 18 or other pan surfaces limit lateral track movement. Stops (not shown) may also be fitted to the pan 14 to engage the brackets 110. The brackets 110, rollers 29' and/or axles 25 can be mounted for passive, operator directed movement or active movement with an appropriate actuator and linkage.

While the invention has been described with respect to a presently preferred assembly and considered improvements, modifications and/or alternatives thereto, still other assemblies and arrangements may be suggested to those skilled in the art. It is also to be appreciated that the features of the foregoing chassis, frame and track can be arranged in different combinations. For example, the track might be included with a different chassis configuration; the bottom contour of the support pan may be configured differently; a different track drive assembly may be coupled to the track; and/or the drive and/or ground contact lugs at the track and/or the slots between flexible filamentary members can be configured differently. The foregoing description should therefore be construed to include all those embodiments within the spirit and scope of the following claims.

What is claimed is:

1. A motorized vehicle comprising:
   a) a chassis supporting an engine, a track and an operator platform;
   b) a drive sprocket coupled to said engine and a plurality of idler wheels and wherein said track is trained around said sprocket and idler wheels; and
   c) wherein said track includes a drive portion and a fringe portion, wherein said fringe portion comprises a plurality of fringe pieces separated by intervening gaps that extend from a lateral side of said drive portion, wherein drive lugs project from an interior surface of said drive portion to engage said drive sprocket, wherein a plurality of ground engaging lugs transversely span and depend from external surfaces of said drive portion and fringe pieces, and wherein internal surfaces of said fringe pieces are mounted to contact surfaces of said chassis and flex with operator movements to steer said vehicle.

2. A vehicle as set forth in claim 1 wherein said fringe pieces extend from left and right sides of said drive portion.

3. A vehicle as set forth in claim 2 wherein bottom surfaces of said chassis are contoured to contact said fringe pieces to direct the flexing of said fringe pieces to promote vehicle steering.

4. A vehicle as set forth in claim 3 wherein said bottom surfaces rise as they transversely extend laterally relative to a longitudinal track axis.

5. A vehicle as set forth in claim 3 wherein said chassis includes a pan having left and right beveled bottom surfaces that respectively incline as they transversely extend relative to a longitudinal track axis and wherein said fringe pieces are mounted to flex upon contacting the left and right beveled surfaces.

6. A vehicle as set forth in claim 5 wherein said pan includes a recess that longitudinally extends relative to said left and right beveled bottom surfaces and wherein said drive lugs are restrained to pass along said recess.

7. A vehicle as set forth in claim 2 wherein a bottom surface of said chassis exhibits a contoured shape that engages said fringe pieces to compress and expand said fringe pieces toward and away from adjoining fringe pieces to promote steering turns and wherein a portion of said bottom surface is shaped to retain and limit lateral movement of said track.

8. A vehicle as set forth in claim 6 wherein said recess includes longitudinal, arcuate side wall surfaces.

9. A vehicle as set forth in claim 2 wherein said fringe pieces are arranged to extend from the left and right sides along a plurality of parallel transverse track axes that extend orthogonal to a longitudinal track axis.

10. A vehicle as set forth in claim 9 wherein the fringe pieces at the left and right sides are arranged to coaxially extend opposite each other along a plurality of transverse axes relative to a longitudinal track axis.

11. A vehicle as set forth in claim 2 wherein said ground engaging lugs exhibit a depending pyramidal-shape having a relatively wide base at the external surface of said track and leading and lagging walls that taper toward each other as they depend to a ridged apex.

12. A vehicle as set forth in claim 10 wherein a plurality of ground engaging lugs span only the width of the drive portion of the track and a plurality of said ground engaging lugs span substantially the entire width of the track.

13. A vehicle as set forth in claim 12 wherein the fringe pieces at the left and right sides are arranged to coaxially extend opposite each other along a plurality of axes that extend orthogonal to a longitudinal track axis.

14. A vehicle as set forth in claim 1 wherein said operator platform comprises first and second foot rest platforms arranged to support the feet of a standing operator and an upright column that supports vehicle controls.

15. A vehicle as set forth in claim 1 wherein an axle supporting at least one of said idler wheels is mounted to rotate the at least one idler wheel in eccentric relation to said chassis to vary the tension of said track relative to said drive sprocket.

16. A vehicle as set forth in claim 1 including a flexing member mounted to engage said fringe pieces with contoured bottom surfaces of said chassis to vary steering direction.

17. A vehicle as set forth in claim 2 including a plurality of flexing members mounted to engage the fringe pieces at the left and right sides with contoured bottom surfaces of said chassis to flex said fringe pieces to provide steering control.

18. A vehicle as set forth in claim 17 wherein said flexing members comprise a plurality of rollers mounted for reciprocating lateral movement to vary the flexion of the fringe pieces at the contoured bottom surfaces.

19. A motorized vehicle comprising:
   a) a chassis supporting an engine, a track and an operator platform and wherein a bottom surface of said chassis includes contoured surfaces that longitudinally extend adjacent an intervening recess;
   b) a drive sprocket coupled to said engine and a plurality of idler wheels and wherein said track is trained around said sprocket and idler wheels; and
   c) wherein said track includes a drive portion and adjoining left and right fringe portions, wherein said fringe portions respectively comprise a plurality of fringe pieces separated by intervening spaces that extend from left and right sides of said drive portion, wherein drive lugs project from an interior surface of said drive portion to engage said drive sprocket and travel in said longitudinal recess, wherein a plurality of ground engaging lugs transversely span and depend from external surfaces of said drive portion and fringe pieces, and wherein internal surfaces of said fringe pieces contact said contoured surfaces to flex with operator movements and steer said vehicle.

20. A vehicle as set forth in claim 19 wherein said recess exhibits side wall surfaces that extend in arcuate relation to a longitudinal axis of the track.

21. A vehicle as set forth in claim 19 wherein the fringe pieces at the left and right sides are arranged to extend opposite each other along a plurality of axes that extend transverse to a longitudinal track axis.

22. A vehicle as set forth in claim 21 wherein a plurality of ground engaging lugs span the width of only the drive portion of the track and a plurality of said ground engaging lugs span substantially the entire width of the track.

23. A vehicle as set forth in claim 21 wherein opposite fringe pieces coaxially extend along a common axis orthogonal to the longitudinal track axis.

24. A vehicle as set forth in claim 19 including a plurality of flexing members mounted to engage the fringe pieces at the left and right sides with the bottom contoured surfaces of said chassis to flex said fringe pieces to provide steering control.

25. A motorized vehicle comprising:
   a) a chassis supporting an engine, a track and an operator platform and wherein a bottom surface of said chassis includes beveled surfaces that longitudinally extend adjacent an intervening recess;
   b) a framework mounted to said chassis including a drive sprocket coupled to said engine and a plurality of idler wheels and wherein said track is trained around said sprocket and idler wheels; and
   c) wherein said track includes a drive portion and a fringe portion, wherein said fringe portion comprises a plurality of fringe pieces separated by intervening spaces that extend from left and right sides of said drive portion, wherein drive lugs project from an interior surface of said drive portion to engage said drive sprocket and travel in said recess, wherein a plurality of ground engaging lugs transversely span and depend from external surfaces of said fringe pieces, and wherein internal surfaces of said fringe pieces contact said beveled surfaces to flex with operator movements and steer said vehicle.

26. A motorized vehicle comprising:
   a) a chassis having an operator platform, an engine, a drive sprocket coupled to said engine, and a track;
   b) wherein said track includes a drive portion coupled to said drive sprocket to rotate and direct vehicle motion; and
   c) wherein said track includes a flexible portion, wherein said flexible portion comprises a plurality of flexible track pieces mounted to contact a contoured substantially rigid bottom surface of said chassis to resiliently expand and contract away from and toward adjoining track pieces in response to weight shifting movements of an operator at said operator platform to vary the gripping action of said track with to the ground to steer said vehicle.

27. A motorized vehicle as set forth in claim 26 wherein said plurality of track pieces comprise a plurality of fringe pieces that transversely extend from said drive portion and that are separated by intervening gaps.

28. A motorized vehicle as set forth in claim 27 wherein said plurality of fringe pieces transversely extend from opposite lateral sides of said drive portion.

29. A motorized vehicle comprising:
   a) a chassis having an operator platform, an engine, a drive sprocket coupled to said engine, and a track;
   b) wherein said track includes a drive portion coupled to said drive sprocket to rotate and direct vehicle motion; and
   c) wherein said track includes a flexible portion, wherein said flexible portion comprises a plurality of flexible track pieces that transversely extend from said drive portion and are mounted to contact a contoured substantially rigid bottom surface of said chassis to resiliently expand and contract away from and toward adjoining flexible track pieces in response to weight shifting movements of an operator at said operator support to vary the gripping action of said track to the ground to steer said vehicle.

30. A motorized vehicle as set forth in claim 29 wherein said flexible track pieces comprise a plurality of fringe pieces that transversely extend to opposite lateral peripheral edges of said track.

31. A motorized vehicle comprising:
   a) a chassis having an operator platform, an engine, a drive sprocket and a track and wherein said track includes a plurality of drive lugs that project from an interior surface and a plurality of ground engaging lugs that project from an exterior surface;
   b) wherein said drive sprocket is coupled to said drive lugs and to said engine to rotate said track such that said ground engaging lugs direct vehicle motion; and
   c) wherein said track includes a flexible portion, wherein said flexible portion comprises a plurality of seriatim fringe pieces separated by intervening gaps that transversely extend relative to a longitudinal axis of said track, wherein said fringe pieces are mounted to contact a contoured bottom surface of said chassis to resiliently expand and contract away from and toward adjoining fringe pieces in response to weight shifting movements of an operator at said operator platform to vary the gripping action of said ground engaging lugs to steer said vehicle.

32. A motorized vehicle comprising:
a) a chassis having an operator platform, a contoured bottom surface, an engine and a track including a plurality of drive lugs and a plurality of ground engaging lugs;
b) wherein said track is trained about a drive sprocket coupled to said engine and a plurality of rotationally mounted idler members coupled to said chassis to rotate in endless fashion and such that said drive lugs engage said drive sprocket to rotate said ground engaging lugs to direct vehicle motion; and
c) wherein said track includes a flexible portion comprising a plurality of flexible pieces separated by a plurality of intervening gaps, and wherein said flexible pieces are mounted to contact said bottom surface and flex with operator movements at said platform to vary a gripping action of said ground engaging lugs with the ground to steer said vehicle.

33. A vehicle as set forth in claim 32 wherein said drive lugs project from an interior surface of a drive portion of said track and wherein said flexible portions comprise a plurality of fringe pieces that transversely extend from opposite lateral sides of the drive portion, wherein said ground engaging lugs project from exterior surfaces of said fringe pieces, wherein the bottom surface of said chassis includes beveled surfaces that engage the fringe pieces to resiliently expand and contract the fringe pieces away from and toward adjoining fringe pieces in response to weight shifting movements of an operator.

* * * * *

UNITED STATES PATENT AND TRADEMARK OFFICE
CERTIFICATE OF CORRECTION

| | | |
|---|---|---|
| PATENT NO. | : 7,784,571 B2 | Page 1 of 1 |
| APPLICATION NO. | : 11/652455 | |
| DATED | : August 31, 2010 | |
| INVENTOR(S) | : Glen Brazier | |

It is certified that error appears in the above-identified patent and that said Letters Patent is hereby corrected as shown below:

Column 10, line 22, in the phrase "with to the ground", delete "to".

Signed and Sealed this

Fourteenth Day of December, 2010

David J. Kappos
*Director of the United States Patent and Trademark Office*